United States Patent Office 3,400,613
Patented Sept. 10, 1968

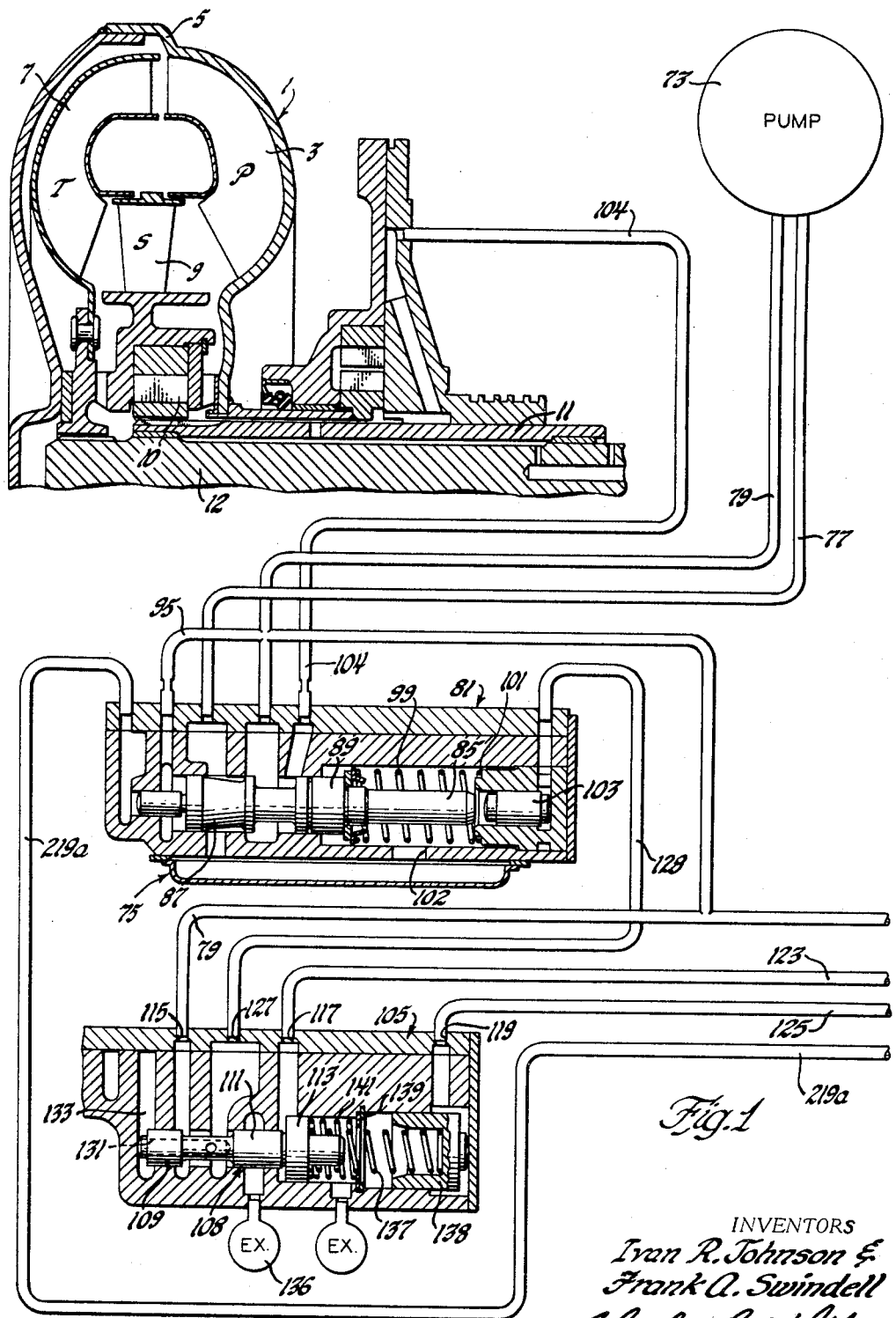

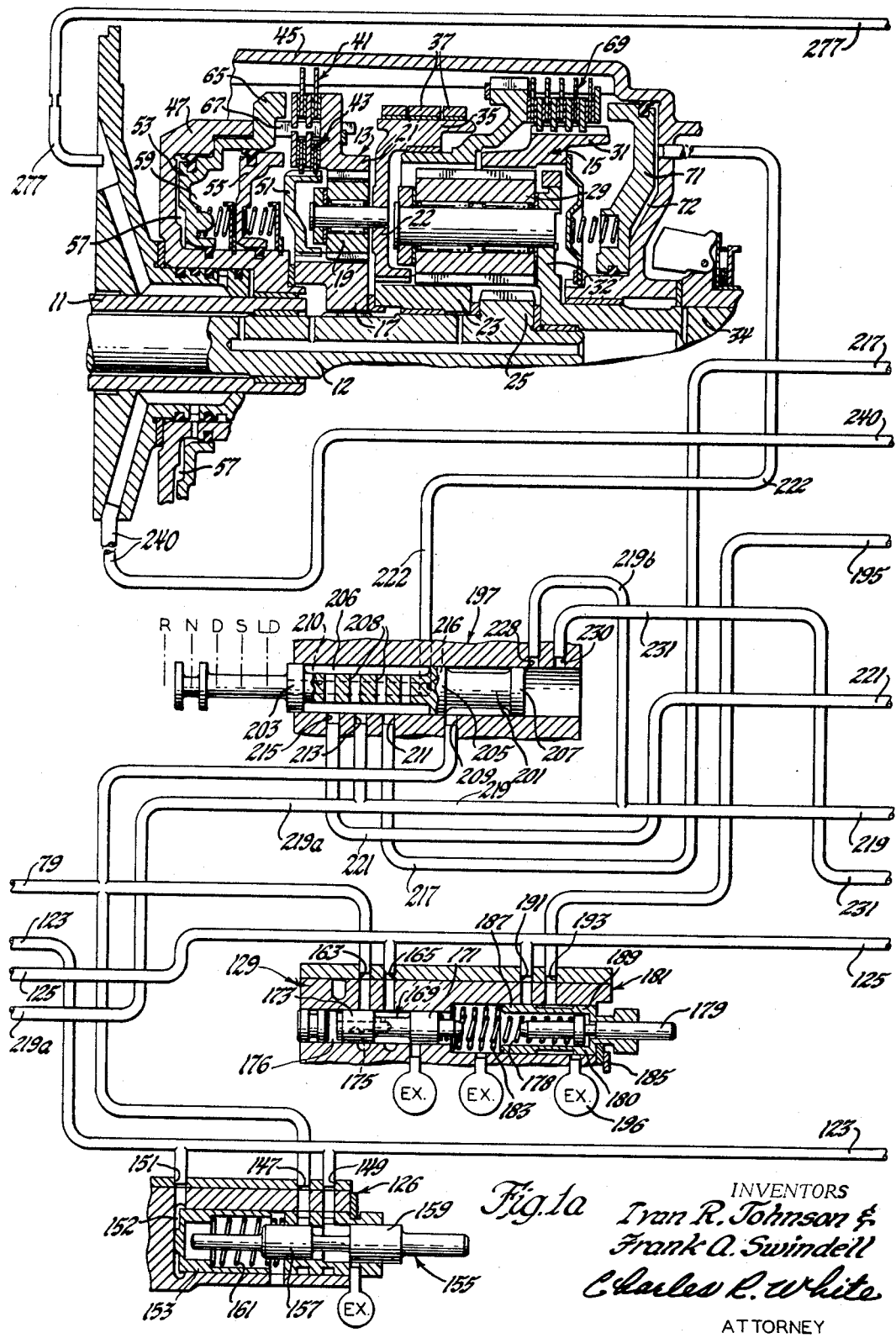

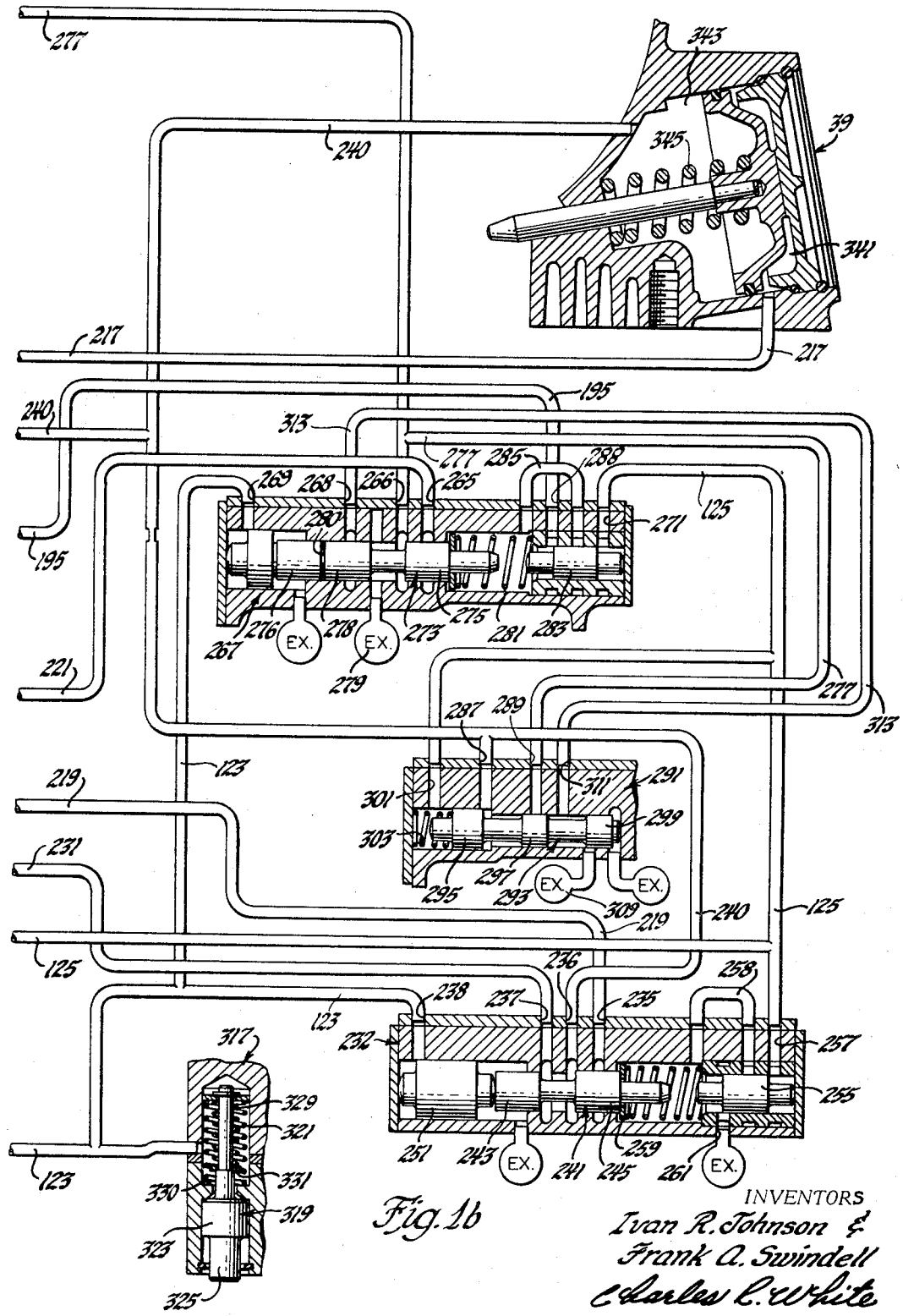

3,400,613
AUTOMATIC TRANSMISSION
Ivan R. Johnson, Royal Oak, and Frank A. Swindell, Detroit, Mich., assignors to General Motors Corporation, Detroit, Mich., a corporation of Delaware
Filed Dec. 29, 1965, Ser. No. 517,275
9 Claims. (Cl. 74—869)

ABSTRACT OF THE DISCLOSURE

A torque converter transmission which has gearing providing three forward drive ratios and one reverse ratio controlled by a hydraulic control system responsive to vehicle speed and vehicle engine torque demand signals for automatically effecting a smooth transition between the forward drive ratios. The control system includes a movable manual valve which can be positioned to condition the controls for fully automatic operation or selectively positioned to condition the transmission for only the low ratio, the second ratio, neutral or the reverse ratio. The controls include a down-shift valve which operates to provide a direct high-to-low shift at zero to light throttle and includes a detent valve for third-to-second down shift at a predetermined throttle opening when the output speed is below a predetermined speed. Part throttle third-to-second down shifts below predetermined output speeds are provided by increasing throttle valve oil pressure to effect down shift of a second-third shifter valve in the controls.

---

This invention relates to automatic power transmissions and particularly to advanced controls for effecting smooth overlap ratio changes with minimum power loss in improved multi-ratio power transmitting gearing.

Prior automatic multi-ratio power transmissions have been successfully employed in vehicles for many years to reduce driver effort in vehicle operation by automatically and efficiently conditioning multi-ratio gearing to meet varying driving conditions. However, due to their complexity and space requirements, such automatic transmissions have not been generally utilized on the smaller, economy-type vehicles which have low power-to-weight ratios that generally require a many-stepped transmission to provide output torques required for vehicle operation.

This invention features a torque converter transmission having three forward speeds and a reverse to provide adequate ratio coverage for vehicles, including those having low power-to-weight ratios, controlled by a straight forward control system automatically responsive to vehicle speed and torque requirements for effecting smooth overlap shifts. This control system includes a pressure regulator, modulator, throttle detent, governor, first-second shift, second-third shift and downshift valves hydraulically coupled for effecting required shifts for automatic operation. The manual valve can be set: (1) for forward drive in which a plurality of drive ratios are automatically selected, (2) at a second range for second ratio starts and in which second ratio is maintained until shift of the manual valve, or (3) for low range operation so that the transmission will be maintained in this low range operation until shift of the manual valve. Movement of this valve to reverse and neutral positions is also possible. The downshift valve functions to provide a direct high-to-low shift at zero to light throttle without going through the second ratio resulting in better vehicle control. Detent or forced third-second downshifts at speeds below a predetermined speed, e.g. 65 m.p.h., are obtained by depressing the accelerator pedal to a predetermined throttle opening position to provide for performance where desirable. Part-throttle third-second downshifts below a predetermined speed, e.g. 35 m.p.h., are provided by depressing the accelerator pedal far enough to increase throttle valve oil pressure and downshift the third-second valve.

It is an object of this invention to provide a new and improved automatic multi-ratio transmission.

Another object of this invention is to provide an automatic multi-ratio power transmission featuring an improved control system for automatically effecting smooth overlap ratio changes in accordance with drive conditions and with minimum power loss.

Another object of this invention is to provide a new and improved automatic transmission control system including an improved manual valve for setting the transmission for: (1) automatic change-speed operation, (2) second range operation only, and (3) solely for low range operation.

Another object of this invention is to provide advanced controls for conditioning power-transmitting mechanism for a plurality of forward drives and includes an improved downshift valve for allowing the transmission to shift directly from third to low at zero to light throttles.

Another object of this invention is to provide an automatic transmission control having an improved modulator valve which furnishes modulated pressure in accordance with governor and throttle-valve pressure to a pressure regulator valve.

These and other objects, features and advantages of this invention become more apparent from the following detailed description, claims and drawings, in which:

FIGURES 1, 1a and 1b serially arranged from left to right illustrate diagrammatically a preferred embodiment of the invention.

The transmission of FIGURES 1 through 1b includes a hydrodynamic torque converter 1 having bladed pump 3, driven by a vehicle power plant, not shown, through housing 5. The converter also has a bladed turbine 7 and stator 9 mounted on one-way brake 10 that is connected to ground sleeve 11. This converter is of conventional design having both torque multiplication and fluid coupling phases of operation. The turbine drives shaft 12 which provides an input to first and second planetary gear units 13 and 15 forming the transmission range gearing.

The first unit includes sun gear 17 driven by the drive shaft 12, pinions 19, ring gear 21 and pinion carrier 22. The second unit includes large sun gear 23 rotatably mounted on shaft 12 and small gun gear 25 driven by this shaft. Short pinions (not shown) mesh with sun gear 25; long pinions 29 mesh with the short pinions, the large sun gear 23 and an outer ring gear 31. A carrier 32 for the long and short pinions is connected to drive the transmission output shaft 34. As illustrated, carrier 22 extends inwardly and has internal splines engaged with the teeth of large sun gear 23 and under certain conditions is adapted to drive that sun gear. This carrier also extends outwardly providing outer annular braking drum 35 adapted to be retarded upon application of braking bands 37 when actuated by servo 39. The first planetary unit 13 is further controlled by concentrically mounted friction-drive-establishing devices 41 and 43. Friction device 41 has cooperating friction plates alternately splined to the interior of the transmission case 45 and to the exterior of piston housing 47, generally half-toroidal in shape, which is rotatably mounted on the ground sleeve 11. Friction device 43 has cooeprating friction plates alternately splined to the interior of housing 47 and to the outer periphery of circular support 51 which is in turn splined or otherwise securely fastened to the sun gear 17.

First and second telescoping pistons 53 and 55 are mounted within the housing 47 for applying friction devices 41 and 43. A pressure chamber 57 is established between the outer piston 53 and the housing and a pressure chamber 59 is established between the two pistons. Suitable return springs are provided to move the pistons to the off position illustrated in the drawing. The outer piston has outwardly extending apply portions 65 which extend through appropriate slots 67 formed in the piston housing.

Another friction-drive-establishing device 69 has co-operating friction plates alternately splined to the interior of case 45 and to the periphery of the ring gear 31 for controlling ring gear rotation. This friction device is operated by piston 71 which forms a pressure chamber 72 between the end of the piston and the transmission case. A return spring moves this piston to the off position illustrated.

With the transmission described above, low range is established by application of brake band 37 to hold the large sun gear 23 of the rear gear unit for reaction. Input is from the shaft 12 to the small sun gear and the rear carrier is driven at reduced speed and increased torque. For overlap shift into second range, drive-establishing device 41 is brought on as brake band 37 is released to hold the ring gear 21 of the first planetary unit. Sun gear 23 of the second unit will be driven by first unit carrier at a reduced speed in the forward direction as sun gear 25 is driven by drive shaft 12. The rear carrier will be driven by the gun gears 23 and 25 at increased speeds with a reduction in torque, as compared with low range drive. For overlap shift into high range drive friction device 43 is applied, as the device 41 is disengaged. This operation locks up the front and rear planetary units, and the transmission gearing will be conditioned for high range or 1:1 drive. Reverse is established by applying the friction device 69 and releasing all others. The ring gear of the rear planetary unit is held for reaction and the output carrier will be driven in a reverse direction with input through the small sun gear 25. The particular transmission gearing and the friction drive establishing devices for the gearing is more fully described in copending application, Ser. No. 504,909, now Patent No. 3,365,985, filed Oct. 24, 1965.

Ths invention features a new and improved hydraulic control system which automatically changes ratios to meet driving conditions and minimizes driver effort in operation of the vehicle. This control system includes an engine-driven fluid pump 73 which draws fluid from sump 75 through suction line 77 into an intake side and pumps oil from a pressure side into a main line or delivery passage 79. The delivery passage extends into a pressure-regulating valve 81 which operates to regulate the pump output pressure in accordance with vehicle speed and torque demand. This regulating valve includes axially movable valve spool 85 having spaced lands 87 and 89 thereon. The regulator valve spool is biased in a first direction by line pressure exerted on one side of land 87 transmitted through branch 95 of main line 79 and by a pressure routed through passage 219a from a selector valve exerted on the end of the spool described below. This spool movement will regulate line pressure as will appear below. The exhaust of line 219a will give higher regulated line pressures in low and reverse drives for increased capacity for those ratios. Opposing the bias of the pressures on the left side of the spool is a coil spring 99 mounted in a spring pocket at the end of the valve which contacts a spring seat 101 and biases the spool in an opposite direction. The movement of the spool to the left in the drawing is also in response to an axial force exerted by a plug 103 movably mounted in the end of valve 81, biased by a modulated pressure into contact with the end of the regulator valve spool. Thus, movement of the spool to the right in the figure opens main line 79 to suction line 77 as well as to exhaust 102 which leads to the sump to reduce line pressure. On the other hand, movement of the spool to the left will prevent exhaust of pressure in the manner described, therefore insuring high line pressures. Passage 104 is a converter feed passage controlled by land 89 which transmits oil to the torque converter 1.

The modulator valve 105 provides a regulated pressure that senses both engine torque and vehicle speed and is used to vary line pressure proportional to engine torque.

As illustrated, the modulator valve furnishes modulated pressure to one end of the pressure regulator valve 81 to bias plug 103 in an axial direction so that line pressure regulated by that valve follows the load.

The modulator valve includes a movable spool 108, having spaced lands 109, 111 and 113. Ports 115, 117 and 119 provide inlets for main line 79, governor line 123 and throttle valve line 125, respectively. Port 127 provides an exit from the valve for modulator pressure line 128 which extends into a port at one end of pressure regulator valve 81 at the end of plug 103. Passage 131 formed in the spool allows oil to enter end chamber 133 and exerts a force on the end of spool 108 to tend to force it to the right in the drawing opening exhaust 136 to reduce modulator valve pressure. Furthermore, governor valve oil pressure enters the modulator valve through the port 117 and exerts a force on large land 113 to force the spool in the same direction. The spool is biased in an opposite direction by a coil spring 137, seated in movable plug 138 in one end of this valve, which contacts land 113. Also throttle valve pressure enters through port 119 and biases plug 138 to the left to increase spring load and exert increased force on spool 108 to increase modulator pressure. Stop 139 limits plug travel. A second spring 141 concentric with spring 137 biases the spool to the left for tailoring output of the modulator valve.

The governor valve 126 has inlet port 147 connected to main line 79, an outlet port 149 for furnishing governor line 123 with regulated pressure and a port 151 connecting governor line 123 to a chamber 152 behind movable plug 153 in the valve. The valve includes a spool 155 having spaced lands 157 and 159 with facing pressure areas of differing areas as shown. One end of this spool is biased by a conventional output speed-responsive governor, not shown, which exerts an axial force on the valve spool that is proportional to the vehicle speed and tends to close the valve from exhaust to increase governor pressure. Spring 161 is seated in a pocket containing a plug 153, and this plug is movable in response to governor pressure in end chamber 152 and tends to reduce the rate of increase of governor pressure after the plug 153 contacts and biases the end of valve spool 155. This plug 153 adds an effective area to land 159.

Throttle valve 129 has inlet ports 163 connected to main line 79 and outlet port 165 coupled to throttle valve pressure line 125. A valve spool 169 having spaced lands 171 and 173 is movably mounted in the valve housing. Passage 175 connects the space between these lands to an end chamber 176 to permit throttle valve pressure to enter therein, and exert a force tending to open the throttle valve to exhaust to reduce throttle valve pressure. A coil spring 178 is seated upon one end of land 171 and extends to a seat on a movable plunger 179 operated by an accelerator pedal, not shown. The movement of plunger 179 toward the spool increases the load on spring 178 and tends to move spool 169 to progressively open line 79 to outlet port 165 for throttle valve line 125 to increase throttle valve pressure.

A movable spool 180 of detent downshift valve 181, normally biased by spring 183 against stop 185, has spaced lands 187 and 189. The detent valve has inlet port 191 connected to the throttle valve line and port 193 which is connected to detent throttle valve line 195 that extends to the second-third shift valve, later described, and functions to provide a full-throttle, forced downshift from third to second gear. In the position shown oil in line 195 will exhaust through exhaust port 196. It will be appreciated that both the throttle valve and detent valve are controlled by operation of the accelerator pedal. Depressing the pedal will move the plunger 179 to the left in the drawing increasing the throttle valve pressure which provides a torque demand signal. This movement is opposed by throttle valve pressure in chamber 176. As accelerator pedal pressure is diminished, it will be seen that the throttle valve pressure will move the spool to the right, thereby decreasing throttle valve pressure and torque demand signal. The throttle valve detent sleeve or spool 190 is moved to the left at full or other predetermined throttle opening to couple the throttle valve line 125 to the detent throttle valve line 195.

The manual or selector valve 197 has an elongated manually movable spool member 201 with spaced lands 203, 205 and 207 thereon which selectively route the flow of fluid to the shifter valves described below, the reverse piston chamber 72, and low servo 39. This spool has elongated opposing grooves 206 connected by passages 208. Side grooves 210 are provided for exhaust of the reverse chamber 72 as will be later described. Line pressure is admitted to the manual valve through inlet port 209. Ports 211, 213, 215 and 216 in the valve housing are connected, respectively, to low apply line 217, first-second shifter valve line 219, second-third shifter valve apply line 221, and reverse apply line 222. The manual valve spool in the drive position "D" connects lines 217, 219, and 221 to main line pressure by virtue of movement of the land 205 to the right to open port 209 to the groove 206. At this time reverse is exhausted through groove 210. Port 228 formed in the end of the manual valve is coupled to a branch 219b of line 219 and is controlled by lands 205 and 207. Port 230 adjacent to port 228 is connected to low exhaust line 231 and is also controlled by these lands. As shown, low exhaust line 231 and first-second shift line 219 lead into the first-second shift valve 232. In position "S" spool land 203 blocks port 215 while line 231 is connected to line 219 by virtue of the position of lands 205 and 207 and drive oil from port 213 is able to reach the first-second shift valve through both lines 231 and 219. In position "LO" ports 213 and 215 are blocked from line oil by land 203; 211 is open and ports 228 and 230 are open to exhaust. In the position "N" the spool is as illustrated and lands 205 and 207 block line inlet port 209 and the manual valve does not route drive oil to any valve or friction device. In position "R" only port 216 and line 222 leading to reverse piston chamber are connected to line inlet port 209 and lands 205 and 207 block all other ports.

The first-second shift valve 232 includes a valve body having an inlet port 235 connected to line 219 and has additional ports 236 conected to line 240, 237 connected to line 231, and 238. Port 238 is connected to governor pressure line 123. This valve also includes a movable spool 241 having spaced lands 243 and 245 provided thereon. Land 245 controls the connection of inlet port 235 to port 236 and thus to the apply line 240 for the second range friction-drive-establishing device leading into chamber 57. Land 243 controls the opening of port 237 connected to low exhaust line 231. Plug 251 is movably mounted in one end of the valve and is responsive to governor pressure transmitted through line 123 and port 238 to bias the spool 241 to the right in the figure to connect lines 219 and 240. A spring 253 mounted in a spring pocket at the other end of the valve biases spool 241 to the left in the figure opposing the bias of governor pressure. A movable plug 255 is also mounted in this end of the valve and is movable in response to throttle valve pressure which enters one end of the valve through port 257. Sufficient movement of plug 255 to the left against the bias of the governor pressure will open the passage 258 to allow throttle valve pressure to act on the spool and washer 259 for quickly moving the valve to downshift position. The plug will, at this time close exhaust 261; line 240 and chamber 57 are exhausted through line 231 leading to the manual valve. Movement of the plug 255 to the right by appropriate movement of the spool 241 opens exhaust 261 and shuts off passage 258 so that lines 219 and 240 are connected.

Line 221 leading from the manual valve terminates in port 265 of the second-third shift valve 267. This valve has port 269 at one end connected to governor line 123. Port 271 at the other end of the valve is connected to throttle valve pressure line 125. A spool 273 is mounted in the valve and has spaced lands 275 and 278 thereon. Land 275 controls the connection of the inlet port 265 to the apply port 266. Plug 276, movably mounted in the end of the valve, responds to governor pressure to bear on one end of the spool 273 to allow land 275 to move from a position in which it blocks port 265 and allows pressure fluid to flow from port 265 to port 266 and into line 277 leading to chamber 59 for apply of the high range friction-drive-establishing device. Land 278 at this time blocks exhaust 279. The end 280 of land 278 and the rounded end of plug 276 provide a chamber adapted to be aligned with the port 268 for a purpose which will be explained. At this time the valve 267 is in its upshift position. Coil spring 281 tends to bias spool 273 to the left to open line 277 to exhaust 279 to reduce pressure in apply chamber 59. A plug 283 in the other end of valve 261 is movable in response to throttle valve pressure entering the valve through line 125 and port 271 to open passage 285 and the end of spool 273 to throttle valve pressure. As shown, port 288 is connected to the detent line 195 and this exhausts the pressure between spool 273 and plug 283 when in the position shown through the detent valve exhaust 196.

The apply line 240 for the second range friction device and the apply line 277 for the third range friction device leading from the shift valves, as illustrated, are connected into ports 287 and 289 of a downshift valve 291. This downshift valve allows the transmission to automatically downshift from high directly into low at zero to light throttle as when approaching a stop signal. As shown, the downshift valve 291 has a bore in which a spool 293, having three spaced lands 295, 297, and 299, is mounted. This valve has an end port 301 connected to the throttle valve pressure line 125. Spring 303 and throttle valve pressure act on the end of the spool 293 tending to bias the spool to the right in the drawing to open port 311 and line 313 to exhaust 309. This is opposed by the bias of the second range apply pressure on the differential area of land 295 since it will be seen that land 295 has an area larger than the area of land 297. Movement of the spool 293 to the left blocks exhaust 309 and opens line 277 to downshift line 313. Port 266 in shift valve 267 will be pressurized and the fluid between plug 276 and land 278 in the second-third shift valve exerts a force on the end of spool 273 to hold the spool in the upshifted position.

Pressure in line 240 from the one-two shift valve causes downshift valve spool 293 to remain to the left in the figure until the normal downshift of this shift valve. After the one-two shift valve is downshifted, the blocking force is removed from the downshift valve allowing spring 303 to move the spool to the right. This opens line 313 to exhaust port 309 thereby removing the blocking pressure and allowing the two-three shift valve 267 to return to the downshifted position.

A low and reverse blocker valve 317 is provided in this transmission control which is responsive to governor pressure to prevent the transmission from being inadvertently placed in reverse and low ranges at predetermined vehicle speeds. Valve 317 includes a movable spool 319 that is biased by governor pressure which is exerted on land 323. When this vehicle speed signal is high enough, the spool will be shifted downwardly against the retarding forces of return spring 321 and extension 325 will then enter a notch or other opening in a suitable mechanism, not shown, to physically prevent the movement of the manual valve into reverse position. Spring 329 adds a retarding force opposing further plunger movement as the seat 331 bottoms on inner seat 330. When governor signal further increases and the retarding force of both springs are overcome, the spool will be forced further downwardly into a position where extension 325 prevents physical movement of the manual valve into low range position. Inhibiting of manual valve movement to the LO position at high vehicle speeds is provided to protect the engine and drive line components.

*Operation*

For operating the transmission, the manual valve may be moved to any of the calibrated positions shown. When the manual valve spool has been moved to the drive position, D, the low apply servo line 217, the first-second shift valve line 219, and the second-third shift valve line 221 will be connected to main line 79. The regulated pressure in lines 79, 217, 219 and 222 is high since the high modulator pressure resulting from high engine load requirements forces the regulator valve spool to the left and closes exhaust 102. Since the low apply line 217 conducts drive oil to low apply chamber 341, the low band servo will move band 37 into engagement with drum 35 to retard rotation of the large sun gear in the rear planetary unit and condition the transmission for low range drives. Governor pressure is low at this time and the lands 245 and 275 in the first-second shift valve and the second-third shift valve effectively block the feed of oil into these valves.

As the vehicle picks up speed, governor pressure will increase and move plug 251 and the first-second shift valve spool to the right to upshift valve 232. This connects the feed line 219 to the apply line 240. This line conducts drive oil to the second range piston chamber 57, causing that piston to move to the right to engage the second range friction-drive-establishing device 41. At this time the low band servo is released since the release chamber 343 is connected by a passage to the apply line 240 and receives pressure fluid. The return spring 345 plus pressure in chamber 343 moves the piston to the right to disengage the low band as the friction-drive-establishing device 41 is engaged for overlap shifts.

As vehicle speed further increases, governor pressure will proportionally increase until the spool of the second-third shift valve is moved to the right to couple the apply line 277 with the feed line 221 of the second-third shift valve. When this occurs, the common chamber 59 of the telescoped pistons is fed by the apply line 277; the pistons 53 and 55 will move in opposite directions and the second range friction-drive-establishing device gradually loses capacity as the inner or high range friction-drive-establishing device gains capacity, providing for smooth overlap shifts. Movement by piston 53 to the off position squeezes oil back into apply line 240. The vehicle is now in high range operation in which the ring gear of the front planetary gear set is connected to the drive shaft with the sun gear so that the carrier rotates at shaft speed and the rear gear set is locked up. As will be appreciated from the above, third-second downshifts and second-first downshifts occur when governor pressure drops and throttle valve pressure rises.

At zero-to-light throttle, when approaching a stop, it is desirable to downshift directly from third to first drive range and for this purpose the downshift valve 291 comes into play. Throttle valve oil pressure will drop off and fluid pressure in the space between lands 295 and 297 will force the downshift spool to the left to close exhaust 309 and connect downshift line 313 to the pressurized apply line 277 since governor pressure will have previously moved the second-third shift valve spool to the right until the space between plug 276 and spool 278 is aligned with the port 268 of the downshift line. When pressurized fluid from line 313 enters this space, the second-third shift valve will be held in its upshifted position regardless of drop in governor pressure. The first-second shift valve will downshift on a drop of this governor pressure and when this valve closes down, the second range apply line 240 will be exhausted through line 231 and the downshift valve will be moved to the right to exhaust the downshift line 313. The second-third shifter valve then downshifts.

In operation these two shifter valves move down almost simultaneously. The low band servo will be applied as the third-range apply line is exhausted to provide for overlap shifting between the third and low range drives.

When the manual valve is shifted to the reverse position, it will be seen that the reverse line 222 is connected to line pressure and the reverse piston will be applied to hold the ring gear of the rear planetary gear set, thereby conditioning the transmission for reverse drives. The first-second shift valve feed line 219 is exhausted via line 219b from the end of the manual valve; branch 219a is also exhausted and there is higher regulated pressure in reverse as well as in low.

The shift valve may be manually set in the second range position S for starts in second gear. It will be seen that the first-second shift valve feed line 219 into the first-second shift valve is blocked by land 245. However, the low exhaust line 231 is on and the second range apply line 240 gets drive oil from this line, supplied through line 219b, to apply friction drive device 41. The first-second spool may also move to the right and, due to area differential between lands 243 and 245, will connect inlet line 219 to apply line 240 conditioning the transmission for second range drive. Since there is no feed to the second-third shift valve because of blockage by manual valve land 203, a third range cannot be established at this time. Also, low cannot be established since release chamber 343 of the low servo cannot be exhausted in this manual valve spool setting.

The manual valve may also be moved to low position LO and the low apply line 217 is fed and the low servo applies; the low exhaust line 231 leading into the first-second shift valve is exhausted as well as second range apply line 240 and release chamber 343. Under these conditions the transmission will be fixed in low range until the manual valve is moved from this position.

Thus, it will be appreciated that the vehicle operator has full control of transmission range selection with the choice of eliminating automatic shifting and using manual shifting to select the desired ratio. If automatic shifting is desired, the manual valve is placed in the D or drive position.

For forced downshifts in automatic operation, when vehicle speed is not too high and performance is needed for passing or other purposes, the operator depresses the accelerator pedal to full-throttle position and the spool of the detent valve is moved to a position where exhaust 196 is closed and detent line 195 is opened to throttle valve oil. This oil enters the chamber between plug 283 and the second-third shift valve spool and exerts a force which biases spool 273 to the left, opening apply line 277 for the third range friction device to exhaust 279; this allows the second range device 41 to engage through the action of apply piston 53 supplied by pressure fluid from the first-second shifter valve.

A part-throttle third-second downshift can be accomplished at medium speeds, e.g. 35 m.p.h., by depressing the accelerator pedal far enough to raise throttle valve pressure. This pressure is effective at the end of plug 283 in the second-third shift valve and will, when high enough, move the plug into engagement with the spool 273 and further move the spool against the opposing force of governor pressure on plug 276. The spool 273 is thus moved into a blocking position in which inlet port 265 is blocked and the apply line 277 is exhausted through exhaust 279. Since at this time the first-second shift valve is in upshift position, pressure in apply chamber 57 will force the apply piston 47 into engagement with the second range friction-drive-establishing device 41 as the third range apply chamber 59 is exhausted.

In neutral position N no friction-drive-establishing devices are on and it will be seen that line pressure is blocked from the shifter valves and friction devices by the manual valve spool.

From the above it will be appreciated that there has been provided a new and improved compact and straight forward transmission which may be operated manually or automatically and which is particularly suitable for use in vehicles having low weight to power ratio.

It will be understood, however, that this transmission may be used in any suitable type vehicles, and further that modifications may be made to the preferred embodiment described above which would be obvious to those skilled in the art. Accordingly this invention is not to be limited to the structure particularly shown and described and applications suggested, but only by the claims which follow.

We claim:

1. In a control system for a transmission having an engine driven input and having an output, gear means operatively connecting said input and said output for providing a plurality of forward drive ratios; first and second and third forward ratio establishing mechanisms operatively connected to said gear means and engageable to establish first, second and third drive ratios; a source of fluid pressure, first valve means connected to said source for providing a torque demand signal, second valve means connected to said source for producing a signal which is a function of transmission output speed, a first-second ratio shifter valve operatively connected to said first and second valve means and to said first and second ratio establishing mechanisms, a second-third ratio shifter valve operatively connected to said first and second valve means and to said third ratio establishing mechanism, fluid conducting means including manual valve means for connecting said source to each of said shifter valves and to one of said ratio establishing mechanisms, said manual valve means including a valve member shiftable to a first position to route drive fluid from said pressure supply means to each of said shifter valves and to said first ratio establishing mechanism to condition said transmission for automatic ratio change between all of said ratios in response to signals from said first and second valve means, and shiftable to a second position to route drive fluid to only one of said shifter valves to condition said transmission for only second forward drive ratio, and being further shiftable to another position to route drive fluid only to said first ratio establishing mechanism and to block the supply of fluid to said shifter valves to thereby condition said transmission only for first forward drive ratio.

2. The control system of claim 1, and further including a reverse ratio establishing mechanism operatively connected to said gear means and engageable to condition said gear means for a reverse drive ratio, fluid conducting means operatively coupling said reverse ratio establishing mechanism with said manual valve means, said valve member of said manual valve being shiftable to a fourth position to route drive fluid to said reverse ratio establishing mechanism to condition said transmission for reverse drive, said last mentioned valve member when shifted to said positions for said forward drive ratios providing exhaust means for exhausting drive fluid from said reverse ratio establishing mechanism.

3. In a control system for a multi-ratio transmission, an engine driven input, an output, gear means providing at least three different forward drive ratios and having input and output means, drive means operatively connecting said transmission input to said input means, drive means operatively connecting said output means to said transmission output; first, second and third fluid-actuated friction drive establishing devices operatively connected to said gear means and selectively engageable to condition said gear means for any selected forward drive ratio, said first friction drive establishing device including an apply chamber and a release chamber, said control system including an apply chamber and a release chamber, said control system including a source of regulated fluid pressure, a first valve means operatively connected to said source for providing a signal which is a function of the speed of said transmission output, second valve means operatively connected to said source for providing a second signal which is a function of engine torque demand, a plurality of shifter valve means operatively connected to said first and second valve means, one of said shifter valve means being operatively coupled to said second friction drive establishing device and also operatively connected to said release chamber of said first friction drive establishing device, another of said shifter valve means being operatively coupled to said third friction drive establishing device, each of said shifter valves including a valve member shiftable in response to opposing signals from said first and second valve means to supply operating fluid to and exhausting fluid from its associated friction drive establishing device, a selector valve operatively connected to said source and to said shifter valve means and also connected to said apply chamber of said first friction drive establishing device, said selector valve including a valve element shiftable to one position to route fluid from said source to each of said shifter valve means and to said apply chamber of said first friction drive establishing device to condition the transmission for automatic ratio changes between said three different forward drive ratios to be made in response to signals from said first and second valve means, said selector valve element being shiftable to a second position to route fluid to one of said shifter valves to condition the transmission for only one of said forward drive ratios and being further shiftable to a third position to route fluid to said apply chamber to condition the transmission for only another of said forward drive ratios.

4. In a control system for a multi-ratio transmission having an input and an output, gear means operatively connecting said input and said output for providing high, intermediate, and low forward drive ratios; first, second and third fluid actuated friction devices operatively connected to said gear means and selectively engageable to condition said gear means for any selected one of said ratios, said control system including a source of regulated fluid pressure, first valve means operatively connected to said source for producing a torque demand signal, second valve means operatively connected to said source for producing a signal dependent upon transmission output speed, a selector valve, fluid conducting means connecting said selector valve to said source and directly to said first friction device, a first-second ratio shifter valve operatively connected to said first and second valve means, to said selector valve and to said first and second friction devices; said shifter valve including a valve element shiftable in response to predetermined signals from said first and second valve means to an upshift position to simultaneously effect the disengagement of said first friction device and the engagement of said second friction device to condition the transmission for said second drive ratio and shiftable in response to other predetermined signals to a downshift position to exhaust fluid from said first and second friction devices to permit said first friction device to be engaged by fluid supplied from said selector valve; a second-third shifter valve operatively connected to said first and second valve means and to said selector valve and to said third friction device; said second-third shifter valve including a valve element shiftable in response to predetermined signals from said first and second valve means to an upshift position to simultaneously effect the engagement of said third friction device and the disengagement of said second friction device and further being shiftable in response to other predetermined signals from said first and second valve means to exhaust fluid from said third device, said selector valve having a valve element shiftable to a first position to route fluid from said source to each of said shifter valves and to said first friction device to condition said transmission for automatic ratio changes between high, low and intermediate ratios and shiftable to a second position to route drive fluid to only one of said shifter valves and to said first friction device to effect the disengagement thereof to condition said transmission for an intermediate speed ratio only and further shiftable to a third position to route fluid to only said first device and blocking the supply of fluid to said shifter valves from said manual valve to condition said transmission for said low speed ratio.

5. In a control system for a multi-ratio transmission having an input and an output, gear means operatively connecting said input and said output for providing low, intermediate and high speed forward drive ratios, a first fluid-actuated friction device operatively connected to said gear means selectively engageable to condition said gear means for said first mentioned ratio, a second friction device operatively connected to said gear means selectively engageable to condition said gear means for said second mentioned ratio, a third friction device operatively connected to said gear means selectively engageable to condition said means for said last mentioned ratio, a source of regulated fluid pressure, first valve means connected to said source for producing a torque demand signal, second valve means connected to said source for producing an output speed signal, a first-second ratio shifter valve operativey connected to said source, said first and second valve means and upshifting in response to opposing signals from said first and second valve means to route fluid to and apply said second friction device and downshifting in response to other signals from said first valve means and exhaust fluid from said second friction device, a second-third shifter valve operatively connected to said source and to said first and second valve means, a manual valve connected between said source and said shifter valves including a valve element shiftable to a first position to route fluid from said source to said second friction device and to said first friction device through said first-second shifter valve in both upshifted and downshifted positions to retain said transmission in second ratio drive, and said valve element being further shiftable to route fluid only to said low range friction device to retain said transmission in low ratio drive and being shiftable to a third position to route fluid to each of said shifter valves and to said first device to condition said transmission and controls for automatic operation dependent upon transmission output speed and torque demand signals from said shifter valves.

6. In a control system for a multi-ratio transmission having an input and an output; planetary gear means operatively connecting said input and said output for providing, low, intermediate and high speed forward drive ratios; first, second and third fluid-actuated friction devices operatively connected to said gear means and selectively engageable to condition said gear means for low, intermediate and high speed forward drive ratios, a source of regulated fluid pressure, first valve means operatively connected to said source for producing a transmission torque demand signal, a second valve means for producing a transmission output speed signal, a first-second shifter valve connected to said source and having a shiftable member with opposing portions connected respectively to said first and second valve and responsive to first opposing signals to route fluid to said second friction device and responsive to second opposing signals to exhaust fluid from said second friction device, a second-third shifter valve connected to said source having a shiftable member with opposing portions connected respectively to said first and second valve and responsive to third predetermined signals from said first and second valve to route fluid to said third device and exhaust fluid from said third device, a manual valve operatively connected to said source to said shifter valves and to said first friction device having a valve element shiftable to a first position to route fluid to said shifter valves and to said first friction device to condition said control system and said gear means for automatic operation dependent upon torque demand and output speed signals and shiftable to a second position to route fluid only to said second and said first friction devices to condition said transmission for second range operation and still further shiftable to a third position to condition said transmission for only low range operation.

7. In a transmission having an input and an output, gear means operatively connecting said input and output providing a plurality of different forward drive ratios, selectively engageable friction means operatively connected to said gear means for selectively conditioning said gear means for any selected ratio, a fluid operated motor mechanism for each of said selectively engageable friction means, two of said motor mechanisms having at least one common fluid receiving chamber, one of said motor mechanisms having a separate release chamber, a source of regulated fluid pressure, first valve means operatively connected to said source for producing a pressure signal dependent upon the speed of a predetermined portion of said transmission, a torque demand control movable between high and zero torque demand positions, second valve means operatively connected to said torque demand control and to source for producing a pressure signal dependent upon torque demand, a manual valve operatively connected to said source, a pair of shifter valves each operatively connected to said manual valve and operatively connected to said first and second valve means and responsive to opposing signals from said valve means by moving into an upshift and downshift position, each of said pair of shift valves being operatively connected to an associated chamber of said motor means for supplying fluid pressure to or exhausting fluid from the chamber, one of said valves of said pair of valves being also operatively connected to said release chamber of one of said motor mechanisms to permit one of said valves to effect engagement of one of said friction devices and simultaneous disengagement with another of said friction devices, a downshift valve having inlet and outlet ports operatively connected to one of said shift valves and a valve member shiftable to connect said inlet and outlet ports for applying a pressure to a predetermined part of said last mentioned shift valve to hold said last mentioned shift valve in an upshifted position until said pressure signal from said second valve has decreased to an amount which permits said first shifter valve to downshift thereby permitting a three-to-one downshift at zero and other predetermined positions of said torque demand control.

8. In a vehicle power transmission having input and output means, gear means operatively connecting said input and output means providing a plurality of forward drive input to output ratios; first, second and third friction devices operatively connected to said gear means and engageable to condition said gear means for low, intermediate and high speed ratios; hydraulic motor means for said second and third friction devices defining a first hydraulic fluid receiving chamber therebetween, a second chamber for said second motor means opposing said first mentioned chamber, a source of hydraulic pressure, a first shifter valve connected to said source and to said common chamber having a valve element movable to an upshift position to supply fluid to said second chamber and movable to a downshift position to exhaust fluid from said second chamber, a second shifter valve operatively connected to said source and said first chamber and having a valve element shiftable to an upshift position to supply fluid to said first chamber and shiftable to a downshift position to exhaust fluid from said first chamber, a governor valve operatively connected to said source and said transmission and said shifter valves for providing pressure signals to said shifter valves proportional to the speed of said output means, a torque demand control means movable between zero and high torque demand positions, a throttle valve operatively connected to said torque demand control means and to said source and to said shifter valves for providing torque demand pressure signals to said shifter valve, said shifter valves being disposed in an upshift position at predetermined positions of said torque demand control means and at predetermined speed of said output means, to condition said gear means for high speed ratios and said second shifter valve downshifting in response to increase pressure signal from said throttle valve means to shift said transmission from high speed ratio to an intermediate speed ratio.

9. In a transmission control for a change speed transmission; said transmission having input and output means operatively connected by gear means and having friction drive establishing devices operatively connected to said gear means and also having hydraulically operated motor mechanisms for each of said devices with apply and release chambers, said control including: a source of hydraulic pressure, a selector valve operatively connected to said source, fluid conducting means connecting said selector valve to the apply chamber of a first of said motor mechanisms, a shifter valve, torque demand signal means and transmission output speed signal means operatively connected to said source and to said shifter valve to upshift and downshift said shifter valve in response to predetermined changes in torque demand and transmission output speed signals, fluid conducting means for connecting said shifter valve to an apply chamber of another of said motor mechanisms and to the release chamber of said first of said motor mechanisms, first and second separate passages between said shifter valve and said selector valve, said selector valve having a valve element movable to a first position to supply fluid to said apply chamber of said first motor mechanism and to exhaust fluid from the release chamber of said first motor mechanism through said shifter valves and one of said separate passages, said selector valve being movable to a second position to supply fluid to said shifter valve through both of said passages to permit said shifter valve to supply fluid to said release chamber of said first motor mechanism and the apply chamber of said second motor to thereby condition said transmission for only one predetermined speed ratio in both upshift and downshift positions of said shifter valve.

No references cited.

FRED C. MATTERN, JR., *Primary Examiner.*

THOMAS C. PERRY, *Examiner.*